Dec. 6, 1932.    G. E. BALDWIN    1,890,356
AUTOMATIC TRAIN PIPE COUPLING
Original Filed May 29, 1929    2 Sheets-Sheet 1

Dec. 6, 1932.  G. E. BALDWIN  1,890,356
AUTOMATIC TRAIN PIPE COUPLING
Original Filed May 29, 1929  2 Sheets-Sheet 2
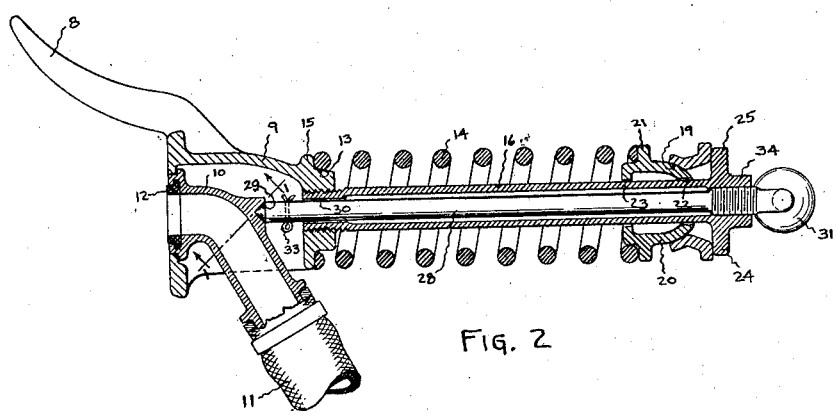
Fig. 2
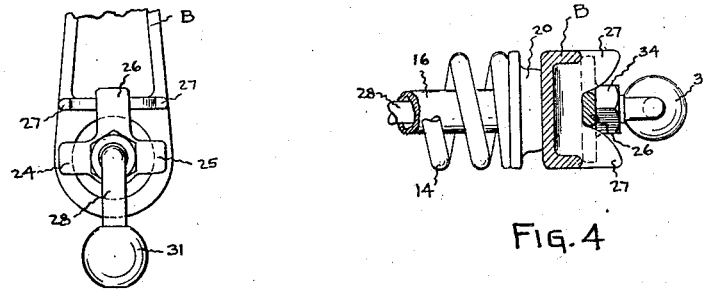
Fig. 3
Fig. 4
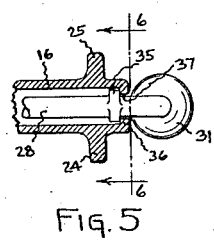
Fig. 5
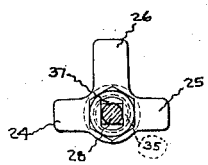
Fig. 6
INVENTOR
Geo. E. Baldwin
BY
Watson, Coit, Morse & Grindle
ATTORNEYS.

Patented Dec. 6, 1932

1,890,356

UNITED STATES PATENT OFFICE

GEORGE E. BALDWIN, OF LIMA, OHIO, ASSIGNOR TO JOSEPH ROBINSON, OF NEW YORK, N. Y.

AUTOMATIC TRAIN PIPE COUPLING

Application filed May 29, 1929, Serial No. 366,789. Renewed January 24, 1931.

My invention relates to improvements in automatic train pipe couplings and has among its objects to provide an improved universal support for such couplings, and an improved means for removing a defective gasket from between the faces of mated coupling heads without first disconnecting the heads or the cars.

With these objects in view, my invention resides in the combinations, arrangements, and constructions hereinafter described, pointed out in the appended claims, and illustrated in the accompanying drawings, in which:

Figure 2 is a horizontal sectional view of the construction illustrated in Figure 1;

Figure 3 is a rear elevation of the lower end of the bracket B;

Figure 4 is a sectional plan view of the universal joint of my improvement taken on the line 4—4 of Figure 1;

Figure 1:
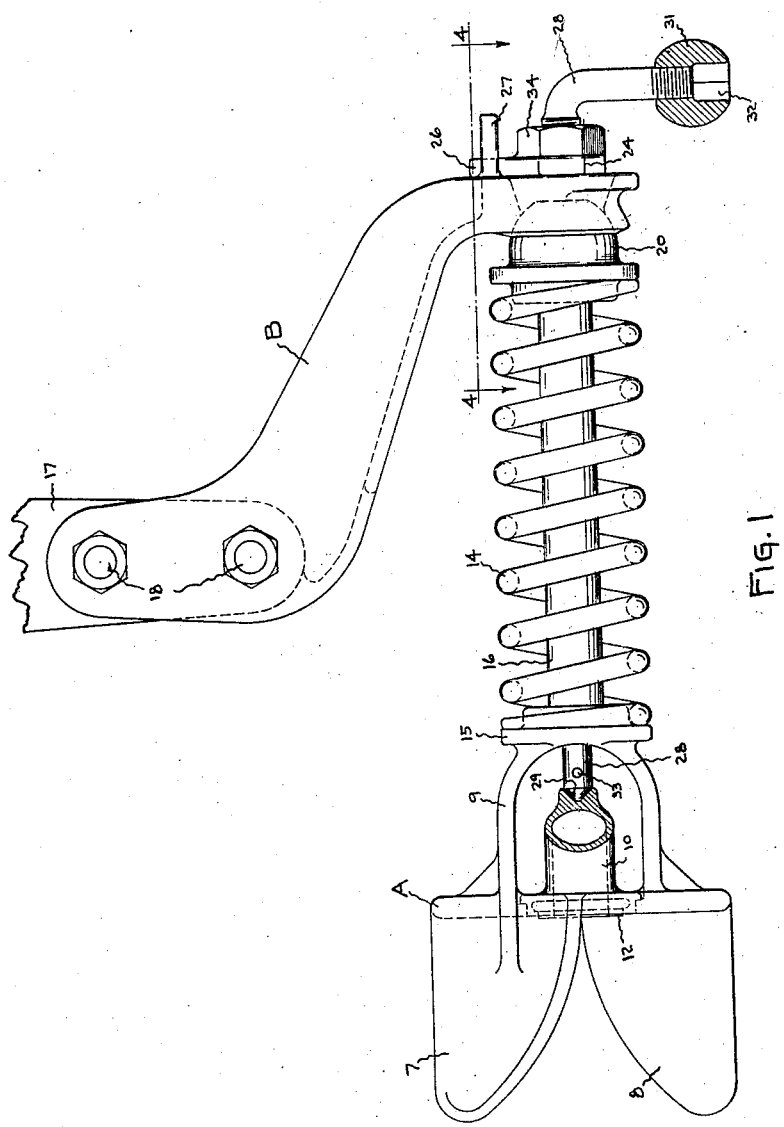
Figure 1 is a side elevation of my improved coupling. In this view the fitting or conduit 10 is shown in section taken on the line 1—1 of Figure 2.

Figure 5 is a sectional plan view of the rear end of the pipe or sleeve 16, and of the rod 28, showing a modification of the means for adjustably securing the rod in the sleeve; and Figure 6 is a rear elevation of the construction shown in Figure 5 taken on the line 6—6 of such figure.

Referring now to the drawings: Any desired type of coupling head A may be used with my improvement. I show a conventional form having suitable guiding wings 7 and 8 to align the head with an opposing head. The head is provided with a hollow shank 9, preferably U-shaped in cross section, which may be cast integrally with the head or otherwise suitably secured thereto. Centrally located in the coupling face of the head, I provide a suitable opening through the latter into which the enlarged forward end of a fitting or tubular conduit 10 extends, as shown particularly in Figure 2. The conduit extends laterally of the head, at the rear side of the latter, and is connected in a suitable manner, preferably as shown, to the usual train pipe hose 11. At its forward end the conduit carries a suitable gasket 12 which extends slightly in advance of the coupling face of the head A and is adapted to make a butting joint with the similar gasket of an opposing head.

At its rear end the shank 9 is provided with an annular seat 13 on which is seated the forward end of a suitable coiled buffer spring 14 located between the coupling head A and the bracket B, the shank 9 being provided with a flange or shoulder 15 against which the spring abuts. In alignment with the opening in the head A, the shank 9 is provided with an interiorly threaded perforation into which the forward end of a sleeve or pipe 16 is tightly screwed, the fit between the threaded parts being sufficiently tight to prevent the coupling head A turning on the sleeve 16.

My improved coupling is suitably attached to the usual coupler lug 17 by means of a forked bracket B which spans the lug and which is attached thereto by means of bolts 18. The lower end of the bracket is provided with an opening therethrough, the rear walls of which opening are flared rearwardly and outwardly, and the forward walls of which form a part spherical bearing 19. Upon this bearing is rockingly mounted a perforated spring seat or block 20, having a part spherical face complementary to the seat 19 and mounted therein, and having also an annular bearing 21 which supports the rear end of the buffer spring 14. It will be observed, especially in Figure 2, that the pipe 16 extends through the lower end of the bracket from the rear of the latter, and forwardly through the perforation in the seat 20, and through the spring 14, into threaded engagement, as aforesaid, with the rear end of the shank 9 of the coupling head A, the seat 20 being provided with bearings 22 and 23 to slidingly support the pipe. Suitable radially extending projections are formed integral with, or otherwise provided on, the rear end of the pipe to engage the rear side of the bracket B and limit the forward movement of the coupling head A with respect to the bracket. Two of these projections, numbers 24 and 25, lie in the horizontal plane and the third, number 26, lies in substantially the vertical plane. To prevent the coupling head rotating unduly when in the normal uncoupled position I provide the bracket B with a pair of rearwardly extending outwardly flaring prongs or guides 27 disposed preferably in the horizontal plane, as shown especially in Figure 4. The tension of the buffer spring 14 holds the projection or lug 26 firmly seated against the bracket between these prongs, thus preventing rotation of the head. When opposing heads couple up in service, the buffer spring 14 is compressed, thus pushing the pipe 16 and the projections 24, 25 and 26 rearwardly out of engagement with the bracket, whereupon the coupling head A may rotate universally through the universal joint formed by the spring seat 20 and the part spherical bearing 19. As the buffer spring 14 pushes the head A forward to a normal uncoupled position, as when a pair of the automatic couplings uncouple, the projection 26 moves along the inner edge of the prongs 27 and brings the head to the proper vertical position.

To maintain the fitting or conduit 10 in position, and to permit removal thereof and of the gasket 12 from the coupling head A and the shank 9 while mated coupling heads remain coupled, I pass a suitable rod or abutment 28 through the pipe 16 and into a flared opening or seat 29 formed on the rear side of the conduit 10 and, preferably, on the axis of the opening in the forward end of the latter. The rod is slidingly supported in the forward end of the pipe 16, as shown, and is threadingly connected near its rear end to the same. The extreme rear end of the rod extends laterally of the pipe 16, and threadingly receives a ball 31 which constitutes gravity actuated means for maintaining the rod 28 in the service position. The ball is screwed onto the rod by a suitable tool passed into the square opening 32 in the ball.

When it is desired to remove a defective gasket with my improvement, the rod 28 is screwed rearwardly through the medium of the handle or ball 31, sufficiently to permit the fitting 10 to be drawn out of the opening in the coupling head A, and out of the hollow shank 9, whereupon the defective gasket 12 may be removed, a new one inserted and the parts reassembled by reversing this operation. A suitable pin 33 passes through the forward end of the rod 28 to prevent undesired rear movement, or extraction of the rod from the pipe or sleeve 16.

The parts of my improvement are assembled by setting the spring seat or block 20 into its bearing 19 on the forward face of the bracket B, mounting the buffer spring 14 thereon, and passing the sleeve 16 through the bracket, the seat 20, and the spring 14, and tightly screwing it into the threaded perforation of the shank 9 by rotating the coupling head A. During this operation the sleeve is held against rotation by contact of the projection 26 with the prongs 27, a hexagonal nut 34 being provided on the rear end of the pipe to facilitate further holding of the latter against rotation if desired. It will be understood that the buffer spring 14 is placed under the required initial compression by screwing the head A onto its sleeve 16 as aforesaid, the threaded connection between these parts being sufficiently rigid as to prevent undesired rotation of the head on the sleeve, and the initial compression to which the buffer spring 14 is subjected being sufficient to yieldingly sustain the coupling head A in the normal horizontal coupling position with the projections 24, 25 and 26 bearing against the rear side of the bracket B, as shown in Figure 1, and limiting the forward movement of the head.

It will be observed that my improved gasket renewing means is particularly adapted for use with train pipe couplings of the type shown, in which the buffer spring 14 is located in front of the bracket B and has universal movement either on or relative to the front face thereof. The rod or abutment 28 may be said to constitute adjustable means operating about an axis coincident to the axis of the opening in the head A to removably maintain the conduit 10 in place, such means being operated from a point at the rear of the universal joint formed by the block 20 and the bearing 19 of the bracket. The flared opening 29 on the rear side of the conduit, and the complementarily flared forward end 29 of the rod 28, comprise means for positioning the conduit, or aligning it, with the opening in the coupling head A, as the rod 28 is moved to the service position. This arrangement also prevents lateral movement of the conduit from the service position, shown in Figure 2.

Figures 5 and 6 illustrate a modification of my improved gasket renewing means, wherein the rod 28 instead of being threaded to the sleeve 16, is removably held therein by a bayonet joint comprising lugs 35 on the rod and shoulders or dogs 36 on the rear end of the sleeve. By lifting the handle 31 to the horizontal plane, the lugs 35 will align with the elongated opening 37 in the sleeve whereupon the rod 28 may be shifted rearwardly out of engagement with the conduit 10, thus permitting the conduit, and gasket 12, to be removed. The reverse of this operation will re-assemble the parts.

While I have shown a ball and socket type of universal joint for permitting free movement to the coupling head A, my improvement may, of course, be used with different forms of universal joints such, for instance, as that shown in U. S. Patent #1,347,986 to M. A. Barber.

What I claim is:

1. In an automatic train pipe coupling, the combination of a coupling head having an opening therein, a support for said head including a bracket, a tubular conduit extending into the opening in said head, and means to support said conduit in said opening and to permit its removal therefrom while mated coupling heads remain coupled, said means being operated from the rear of said bracket.

2. In an automatic train pipe coupling, the combination of a coupling head having an opening therein, a support for said head including a bracket, a tubular conduit extending into the opening in said head, and means to support said conduit in said opening and to permit removal thereof from the opening while mated coupling heads remain coupled, said means being located on an axis substantially coincident to the axis of said opening and being operated from the rear of said bracket.

3. In an automatic train pipe coupling, the combination of a coupling head having an opening therein, a support for said head including a bracket, a tubular conduit extending into the opening in said head, and means to support said conduit in said opening and to permit removal thereof from the opening while mated coupling heads remain coupled, said means comprising an abutment operated from the rear of said bracket and adapted to be moved longitudinally into and out of engagement with said conduit.

4. In an automatic train pipe coupling, the combination of a coupling head having an opening therein, a support for said head including a bracket, a tubular conduit extending into the opening in said head, and means to support said conduit in said opening and to permit removal thereof from the opening while mated coupling heads remain coupled, said means comprising an abutment operated from the rear of said bracket and adapted to be shifted longitudinally into and out of engagement with said conduit, said abutment having a tapered forward end adapted to enter a complementarily shaped bearing on the rear side of said conduit to position the conduit relative to said opening.

5. In an automatic train pipe coupling, the combination of a coupling head having an opening therein, a support for said head including a bracket, a tubular conduit extending into the opening in said head, and means to support said conduit in said opening and to permit removal thereof from the opening while mated coupling heads remain coupled, said means comprising an abutment operated from the rear of said bracket and adapted to be threadingly adjusted longitudinally of said support into and out of engagement with said conduit.

6. In an automatic train pipe coupling, the combination of a coupling head provided with an opening and having also a rearwardly extending hollow shank, a support for said head including a perforated bracket, a seat for a spring mounted on said bracket for rocking movement thereon, said seat having an opening therethrough, a tube extending through said bracket and said seat into engagement with said shank, a coiled spring surrounding said tube and supported at one end by said spring seat and at the other end by said shank, said spring serving to extend said coupling head, a conduit extending into the opening in said coupling head, and a rod extending from the rear side of said bracket forwardly through the tube into engagement with said conduit to support the latter with respect to said coupling head.

7. In an automatic train pipe coupling, the combination of a coupling head provided with an opening and having also a rearwardly extending hollow shank, a support for said head including a perforated bracket, a seat for a spring mounted on said bracket for oscillatory movement, said seat having an opening therethrough, a tube extending through said bracket and said seat into engagement with said shank, a spring surrounding said tube and supported at one end by said spring seat and at the other end by said shank, said spring serving to extend said coupling head, a conduit extending into the opening in said coupling head, and a rod extending from the rear side of said bracket forwardly through the tube into supporting relation to said conduit, said rod being adjustable longitudinally in said tube into and out of engagement with said conduit.

8. In an automatic train pipe coupling, the combination of a coupling head provided with an opening and having also a rearwardly extending shank, a support for said head including a perforated bracket, a seat for a spring mounted on said bracket, said seat having a spherically shaped face seated in a complementarily formed bearing on said bracket for oscillatory movement therein, said seat having an opening therethrough, a tube extending through said bracket and said seat into rigid engagement with said shank, said tube being provided with a radially extending projection adapted to engage the rear side of said bracket to position said coupling head relative to the bracket, a spring surrounding said tube and supported at one end by said spring seat and at the other end by said shank, said spring serving to extend said coupling head, a conduit extending in said shank and into the opening in said coupling head, a rod mounted in said tube and shiftable longitudinally therein to removably support said conduit in said head and shank, and means for maintaining said rod in the service position.

9. In an automatic train pipe coupling, the combination of a coupling head provided with a hollow shank, a support for said head including a perforated bracket having on its front face a part spherical bearing, a spring seat having a part-spherical face mounted in said bearing for universal movement therein, said seat having an opening therethrough, a tube extending through said bracket and said seat into engagement with said shank, the tube being adjustable longitudinally in the shank and having a radially extending projection, a coiled spring interposed between said shank and said spring seat to yieldingly sustain said coupling head with said projection engaging the rear side of said bracket, and a member adjustably mounted in said tube and extending into engagement with said conduit to removably maintain the latter in position in said shank.

10. In an automatic train pipe coupling, the combination of a coupling head provided with a hollow shank and having also an opening, a conduit extending into said shank with its forward end supported in said opening, a support for said head including a bracket, a coiled spring interposed between said head and bracket for extending the head, and a member extending from within said spring into the hollow of said shank to force said conduit against said head, whereby the conduit is removably maintained in place.

11. In an automatic train pipe coupling, the combination of a perforated coupling head having a shank provided with an opening, a conduit extending into the perforation in said head, a support for said head including a perforated bracket, a stem extending through the bracket into engagement with said shank, a rod extending through the bracket and through the opening in said shank into engagement with said conduit, means to shift said rod longitudinally of said stem into and out of engagement with said conduit, means to limit the extent of such shifting, and means to maintain said rod in the shifted position.

12. In an automatic train pipe coupling, the combination of a perforated coupling head having a shank provided with an opening, a support for said head including a perforated bracket, a conduit extending into the perforation in said head, a tube extending through the bracket and connected to said shank, a rearwardly extending outwardly flaring lug located on the rear side of said bracket, a projection on said tube co-acting with said lug to prevent undue rotation of the coupling head about its longitudinal axis, and a rod extending through the bracket into engagement with said conduit to removably maintain the conduit in the service position.

13. In an automatic train pipe coupling, the combination of a coupling head having a shank, a spring engaging said shank to support the head, a gasket carried at the face of said head, and means for removing said gasket while said head is coupled to a companion head, said means including a member adjustably supported in said shank and extending into said spring.

14. In an automatic train pipe coupling, the combination of a coupling head having a shank provided with a rear wall, a spring engaging said shank to support the head, a gasket carried at the face of said head, and means for removing said gasket while said head is coupled to a companion head, said means including a conduit, and a member extending from within said spring through the rear wall of said shank into engagement with said conduit.

15. In an automatic train pipe coupling, the combination of a coupling head having a shank, a coiled spring engaging said shank to support the head, a gasket carried at the face of said head, and means for removing said gasket while said head is coupled to a companion head, said means including a sleeve secured to said shank and arranged within said spring, and a member supported in said sleeve for longitudinal movement therein.

16. In an automatic train pipe coupling, the combination of a coupling head having a shank provided with a rear wall, a spring engaging said shank to support the head, a gasket carried at the face of said head, and means for removing said gasket while said head is coupled to a companion head, said means including a conduit, and a member extending from within said spring through the rear wall of said shank into engagement with said conduit to lock the conduit against lateral movement relative to said shank.

17. In an automatic train pipe coupling, the combination of a coupling head, a support for said head including a universal joint adapted to permit universal movement to the head, a gasket carried at the face of said head, and means to remove said gasket while said head is coupled to a companion head, said means including a member extending through said universal joint.

18. In an automatic train pipe coupling, the combination of a coupling head, a support for said head including a universal joint adapted to permit universal movement to the head, a gasket carried at the face of said head, and means to remove said gasket while said head is coupled to a companion head, said means including a member extending through said universal joint and shiftable longitudinally therein.

19. In an automatic train pipe coupling, the combination of a coupling head, a support for said head including a universal joint adapted to permit universal movement to the head, a gasket carried at the face of said head, and means to remove said gasket while said head is coupled to a companion head, said means including a member extending through said universal joint and threadingly shiftable longitudinally therein, and a device for maintaining said member in the shifted position.

20. In an automatic train pipe coupling, the combination of a coupling head, a support for said head including a universal joint adapted to permit universal movement to the head, a gasket carried at the face of said head, and means to remove said gasket while said head is coupled to a companion head, said means including a laterally extending conduit mounted in said coupling head in supporting relation to said gasket, and a member extending through said universal joint into engagement with said conduit to removably maintain the latter in said coupling head.

In testimony whereof I hereunto affix my signature.

GEORGE E. BALDWIN.